INVENTOR.
DONALD E. SCHRADER,
BY
AGENT.

United States Patent Office 3,412,398
Patented Nov. 19, 1968

3,412,398
DISPLAY DEVICE WITH ELECTRONICALLY CONTROLLED PERSISTENCE
Donald E. Schrader, Canoga Park, Calif., assignor to Hughes Aircraft Company, Culver City, Calif., a corporation of Delaware
Filed Aug. 14, 1967, Ser. No. 661,496
8 Claims. (Cl. 343—5)

ABSTRACT OF THE DISCLOSURE

Positions of a sensing system scanning at a low information rate are represented by azimuth and elevation position voltage. A target generated by the system opens a gate and the target position is sampled and stored. This target, which is in the form of a voltage level, is stored and then compared to a raster rate sweep voltage. When the two voltages are coincident, a gate is opened allowing target return voltages to be gated to the grid of a cathode ray tube allowing the position of the target to be displayed at the raster rate. The target position is displayed as an intensified spot on the cathode ray tube screen and the amplitude of the target return voltage controls the brightness of the spot. The position voltage is resampled each time the sensing system receives a target return so that the position of the target is continuously updated at the one or two second frame rate of the sensor system. The target is displayed at the raster rate and thus no flicker appears on the scope.

Background of the invention

Figure 1:
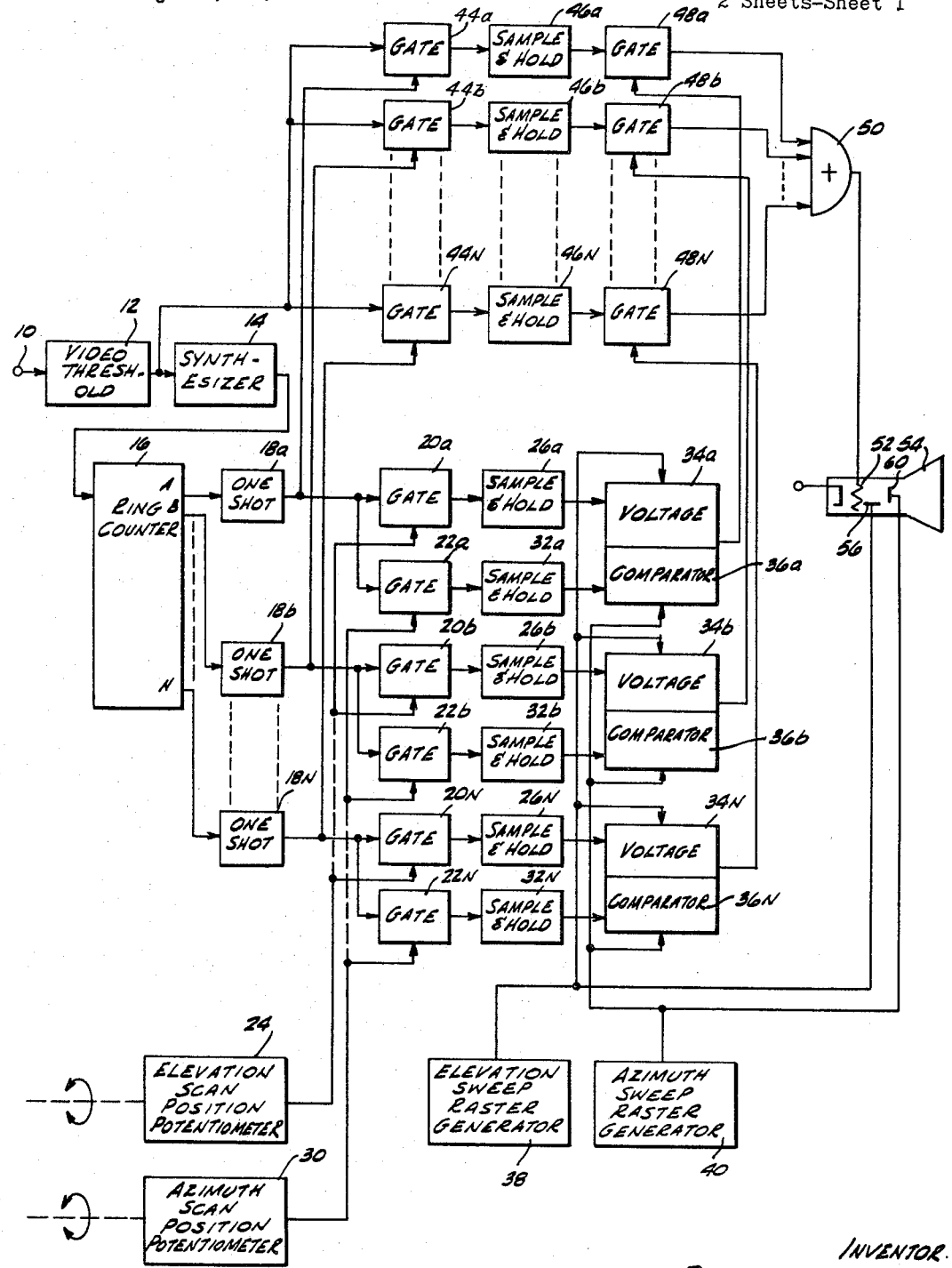

This invention relates to electronic display devices and more particularly to a novel and improved sample and storage system which is capable of simultaneously displaying on a display tube a plurality of objects with lingering and controllable persistance with a minimum of flicker.

Heretofore, prior art devices have employed storage tubes whch have screens treated with a suitable coating to cause an object displayed thereon to persist between the scanning times of the electron beam within the storage tube. These prior art devices requiring the storage tubes are quite expensive and thus increase the cost of display systems. Too, these devices have persistence which is not electronically controllable. Therefore, if an ordinary display tube without the storage capacity such as a standard TV tube could be used, an advantage could be gained by the cost reduction. Also, if electronic equipment is provided to store the target rather than on the screen itself, the components used therein can be made adjustable and thus the persistence can be made variable. Systems using TV tubes or the like have been attempted with a minimum of success because there is a tendency to have a considerable flicker due to the slow scan time and also a low information rate of target data from a radar return system or the like. It follows, then, that the resolution of the object displayed on the screen is low.

The present invention accomplishes the above advantages by using digital circuitry, as an example, with video return signals from a radar system or the like and stores the signal in electrical components for a finite number of displayed targets. This is accomplished by generating a raster similar to the standard TV raster so that each spot on the scope is swept at a rate of 30 c.p.s. or greater to make the flicker invisible to the human eye. The incoming video signals are sent through a threshold device. These signals are then converted to a synthetic video pulse of a standard height but with a pulsewidth equal to the video pulse which passes through the threshold device. The synthetic viedo is then used to increment a ring counter or the like. The output pulsewidth of the counter circuit is set to be equal or greater than the desired target width from a point source target. The first target encountered produces a pulse at a first channel of the ring counter and succeeding targets cause pulses to be steered to succeeding channels, until a last channel is reached, at which time the next pulse causes the counter to count over. In each channel the pulse therein is used to sample the azimuth scan position. The same happens to the elevation scan position. Each position signal is electronically stored in a device which may have a time constant which determines the length of persistence for storage. These azimuth and elevation signals are then compared with the raster generator signals and when a coincidence occurs between the two, a pulse is generated. A coincident output pulse is then gated by the original video target pulse and when a coincidence occurs, the grid of the display tube is amplitude modulated and allows the target to be displayed. The brightness of the target displayed thereon is dependent upon the amplitude of the target pulse. A means is provided to sample the target pulse and to determine its total width. If the target is wider than a predetermined desired width, the storage device is automatically discharged and the target amplitude is reduced to zero. Thus, wide and undesired targets are cancelled and no longer displayed.

It therefore becomes one object of this invention to provide a novel and improved display system with control persistence and a minimum of flicker and which employs a standard TV tube rather than the storage tubes of the prior art systems.

Another object of this invention is to provide a novel and improved display system with a variable storage time of a displayed object.

Another object of this invention is to provide a novel and improved display system which can simultaneously store a plurality of objects and display them simultaneously on the screen of a display scope without limitations to the storage time.

Another object of this invention is to provide a novel and improved storage device which includes a proportional amplitude modulation to the grid of the display scope and also provides pulsewidth discrimination of the incoming pulse to be stored thereon and which has control persistence of the stored target.

Figure 2:
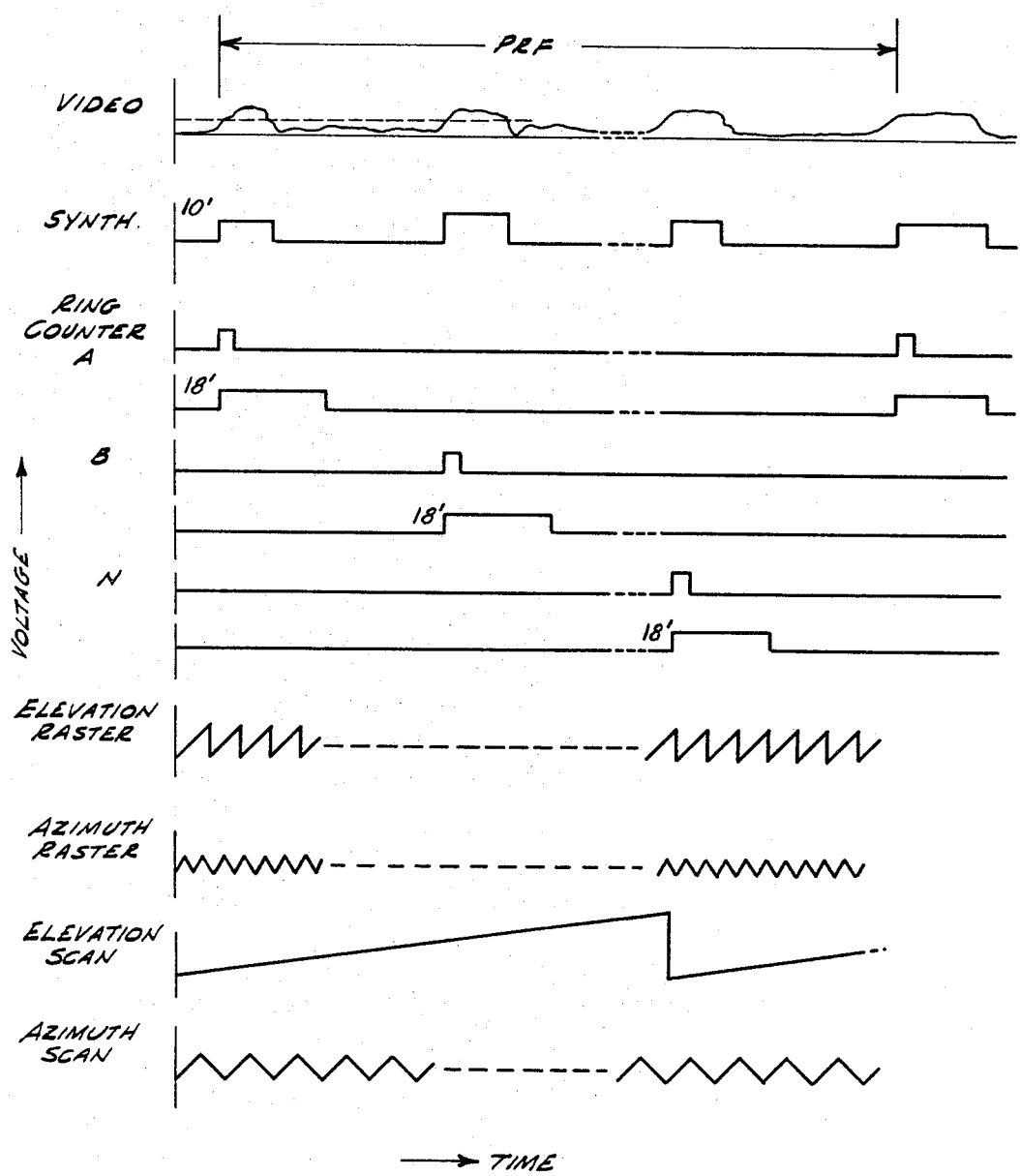

These and other objects, features and advantages will become more apparent to those skilled in the art when taken into consideration with the following detailed description wherein like reference numerals indicate like and corresponding parts throughout the several views and wherein:

FIGURE 1 is an electrical block diagram illustrating a preferred embodiment of this invention; and FIGURE 2 is a graph showing the various waveforms as they appear in specific components of the block diagram of FIGURE 1.

Description of one preferred embodiment

Turning now to a more detailed description of this invention, there is shown in FIGURE 1 an input terminal 10 which is coupled as an input to a video threshold device 12 which detects only selected threshold levels of input video signals applied to input terminal 10. The output of video threshold device 12 is coupled as an input to a synthesizer 14 which provides a synthetic video signal on the output thereof which is substantially squared to drive digital components and still retain the original pulsewidth provided by the video threshold divice 10. The output of synthesizer 14 is coupled as an input to a suitable ring counter 16 which may be of the conventional type well known to those skilled in the art. The ring counter 16 provides a plurarilty of outputs designated A, B–N. Each of these outputs A–N are coupled to monostable multivibrators hereinafter referred to as one shots 18a, 18b and 18n. The pulsewidth of these one shots 18a–18n are fixed in time as shown in FIGURE 2 as the graph 18' and have a pulsewidth which is at least longer than the normal video signal shown at 10' in FIGURE 2. One shot 18a has an output which is coupled as an input to a gate 20a, and also has an input to a gate 22a. The output of one shot 18b is coupled as an input to a gate 20b and also as an input to a gate 22b, and the output of one shot 18n is coupled to the input of a gate 20n and also as an input to a gate 22n. The outputs of one shot 18a–18n supply the enabling signals to the gates 20a–20n and 22a–22n. An elevation scan position generator 24 which may be in the form of a potentiometer and of the suitable type for generating voltage levels indicative of the elevational position of a target sensed by a radar system provides an output which is coupled to a sample and hold circuit 26a, 26b and 26n through the gates 20a, 20b and 20n. Thus each time a selected one shot 18a–18n enables a gate 20a–20n, the voltage level provided by the elevation scan potentiometer 24 is sampled and stored in a sample and hold circuit 26a–26n. Similary, an output voltage from the azimuth scan position potentiometer 30 is applied to one of gates 22a, 22b and 22n and a particular gate is enabled by the output of its respective one shot 18a–18n. The azimuth signal is applied to a sample and hold gate 32a, 32b and 32n respectively. The output of the sample and hold gates 26a–26n, and 32a–32n appear as voltage levels to voltage comparators 34a–34n and 36a–36n.

Also coupled to voltage comparators 34a, 34b and 34n is the output from a suitable elevation sweep raster generator 38 which is the conventional type raster generator used, for example, on the horizontal sweep of a TV tube or the like, and also coupled to voltage comparators 36a, 36b and 36n is the output of a suitable azimuth sweep raster generator 40 which may be of the conventional vertical sweep raster generator used with the standard TV scope or the like. Voltage comparator pairs 34a and 36a, 34b and 36b and 34n and 36n provide an output only when azimuth scan position 30 and azimuth sweep voltage from raster sweep generator 40 are coincident simultaneously when elevation scan position 24 and elevation sweep voltage from raster generator 38 are coincident.

The output of video threshold device 12 is also coupled as an input to gates 44a, 44b and 44n. Each of these gates is enabled by the respective outputs of one shot 18a being coupled to gate 44a, 18b being coupled to gate 44b, and one shot 18n being coupled to gate 44n. Thus, when a threshold voltage of the video signal is applied to the appropriate gate 44a–44n and ring counter 16 enables its respective one shot, the threshold voltage is stored in its respective sample and hold circuit 46a, 46b or 46n respectively. These stored voltages are then applied to a gate 48a, 48b or 48n, depending upon which of these gates is enabled by the output signal of its appropriate voltage comparator pair 34a and 36a, 34b and 36b, 34n and 36n where voltage comparator 34a and voltage comparator 36a are coupled to gate 48a. Voltage comparator 34b and voltage comparator 36b are coupled to gate 48b, and finally voltage comparator 34n and voltage comparator 36n are coupled to gate 48n.

Each of the outputs of gate 48a, 48b–48n is coupled to an OR gate 50 which is in turn coupled to the grid 52 of a TV tube 54. The output of the elevation sweep raster generator 38 is also coupled to its appropriate plate 56 within tube 54 and the output of azimuth sweep raster generator 40 is coupled to its appropriate plate 60 within tube 54.

*Operation*

Thus, it can be seen that when the voltage level of the elevation scan position 24 is gated by its appropriate gate 20a, 20b or 20n and the voltage applied thereby is coincident with the voltage level from elevation raster generator 38 as determined by voltage comparator 34 simultaneously when the azimuth position signal and azimuth sweep signal are coincident (as set forth in FIGURE 2), the threshold video signal provided at terminal 10 is gated through gates 44a–n at predetermined ring counter time and through gates 48a–n when the coincidence appears in voltage comparators 34a–n and 36a–n, the OR gate 50 is enabled and the signal is displayed on the cathode ray tube 54.

Raster generators 38 and 40 are continuously operated at a repetition rate of 30 c.p.s. or better to decrease the flicker on the face of tube 54.

The voltages generated by position potentiometers 24 and 30 is normally a low rate signal and by the system of this invention, the spot indicating the target is displayed as an intensified dot on the face of tube 54 at the repetitious raster rate. The position voltage is sampled each time a target return is attained so the position is continuously upgraded at the rate of one or two frames per second of the position system.

This system would be particularly applicable for displaying multiple targets of a track-while-scan radar or an IR system. If four or five targets are being tracked at the same time, the one to two frames per second flicker is particularly bad and most such systems have had heretofore required a storage tube.

Having thus explained one embodiment of this invention, what is claimed is:

1. A system for displaying aperiodically received information on a display device comprising:
   a means for distributing the aperiodically received information signals having a plurality of output circuits and being coupled to said source;
   a first plurality of channels, each channel of said first plurality being coupled to selected output circuits of said distributing means;
   a second plurality of channels, each said channel of said second plurality corresponding to selected channels of said first plurality, said second plurality of channels having output circuits coupled to the display device;
   a means for generating a raster signal being coupled to said first plurality of channels and to the display means; and
   a means for generating a scan position signal being coupled to said first plurality of channels whereby selected ones of said first plurality of channels are enabled when a raster signal coincides with a scan position signal.

2. The system as defined in claim 1 wherein said channel of said first plurality includes a gate coupled between the output circuit of said distributing means and said scan position generating means, and including an output circuit and a coincident circuit coupled between the output means of said gate and to said second plurality of channels, said gate being enabled by said scan position means.

3. A system for displaying aperiodically received information comprising a source of aperiodically received information signals;
   a cathode ray tube having a grid electrode and horizontal and vertical deflection plates;
   a ring counter, said ring counter having a plurality of output means, said ring counter being coupled to the source of aperiodically received information signals, said ring counter being incremented by aperiodically received signals from said source;
   a first plurality of channels, each channel of said plurality being coupled to sequentially selected output means of said ring counter;

a second plurality of channels, each said channel of said second plurality corresponding to selected channels of said first plurality of channels, said second plurality of channels having output means coupled to the grid of said cathode ray tube and the grid of said cathode ray tube being enabled by signals generated on the output means of said first plurality of channels;

a raster generator being coupled to said first plurality of channels and the horizontal and vertical deflection plates of said cathode ray tube; and a scan position generator being coupled to said first plurality of channels whereby selected ones of said first plurality of channels are enabled when said raster signal coincides with said scan generator signal.

4. The system as defined in claim 3 wherein each channel of said first plurality of channels includes a gate coupled between the output means of said ring counter and said scan position generator and including an output means, and a coincident circuit coupled between the output means of said gate and to said second plurality of channels, said gate being enabled by said scan position generator.

5. A system for displaying aperiodically received information from an information source on the screen of a cathode ray tube comprising:

a first channel including; a gate having a first input means, a second input means, and an output means, a storage means coupled to the output means of said gate, and a coincident circuit having a first input means coupled to the output means of said storage means and a second input means and an output means;

a source of information signals having an output means coupled to the first input means of said gate of said first channel for enabling said gate whenever an aperiodically received information signal from said source is present;

a position signal means, said position signal means having an output means for providing a signal indicative of the relative position of the object to be displayed, the output means of said position means being coupled to the second input means of said gate of said first channel;

a raster generating means having an output means for providing sweep voltages to the cathode ray tube, the output means of said raster generating means being coupled to the second input means of said coincident circuit of said first channel; and a second channel including: a storage means coupled to the output means of said source of information signals, and a gate, said gate having an input means coupled to said storage means of said second channel, a second input means coupled to the output means of said coincident circuit of said first channel and an output means coupled to the control grid of said cathode ray tube.

6. The system as defined in claim 5 wherein said storage means is a sample and hold circuit.

7. The system as defined in claim 5 wherein said coincident circuit is a voltage comparator.

8. The system as defined in claim 6 wherein the information of said source of information is radar video return signals.

References Cited

UNITED STATES PATENTS 3,230,530   1/1966   Balding _____ 343—5

RODNEY D. BENNETT, *Primary Examiner.*

CHARLES L. WHITMAN, *Assistant Examiner.*